(12) United States Patent
Yingst et al.

(10) Patent No.: US 12,398,610 B2
(45) Date of Patent: Aug. 26, 2025

(54) PENETRATOR SYSTEM FOR ELECTRICAL SUBMERSIBLE PUMPS

(71) Applicant: Sonic Connectors Ltd., Odessa, TX (US)

(72) Inventors: Bradley Yingst, Friendswood, TX (US); Brody Whitley, Midland, TX (US)

(73) Assignee: Sonic Connectors Ltd., Odessa, TX (US)

( * ) Notice: Subject to any disclaimer, the term of this patent is extended or adjusted under 35 U.S.C. 154(b) by 0 days.

(21) Appl. No.: 18/539,711

(22) Filed: Dec. 14, 2023

(65) Prior Publication Data

US 2024/0209712 A1    Jun. 27, 2024

Related U.S. Application Data

(60) Provisional application No. 63/434,301, filed on Dec. 21, 2022.

(51) Int. Cl.
| | |
|---|---|
| E21B 3/04 | (2006.01) |
| E21B 33/04 | (2006.01) |
| E21B 43/12 | (2006.01) |
| F16L 5/02 | (2006.01) |

(52) U.S. Cl.
CPC ........ *E21B 33/0407* (2013.01); *E21B 43/126* (2013.01); *F16L 5/02* (2013.01)

(58) Field of Classification Search
CPC ... E21B 33/0407; E21B 33/068; E21B 43/126
See application file for complete search history.

(56) References Cited

U.S. PATENT DOCUMENTS

2023/0092719 A1*  3/2023  Marbach .............. H01R 13/621
                                                    166/65.1

* cited by examiner

*Primary Examiner* — Kristyn A Hall
(74) *Attorney, Agent, or Firm* — Baker & McKenzie LLP (57) ABSTRACT

The present disclosure relates to a wellhead penetrator system comprising a penetrator body comprising a hollowed cylindrical frame connecting a top end to a bottom end; a cable seal located within the penetrator body, comprising: a cylindrical core made of a polymer having three cylinder-shaped port holes configured to each provide a path for of the three insulated electrical wires; a top side, wherein the port holes extend upward from the top side of the cable seal; and a bottom side facing into the cavity located in the bottom end of the penetrator body, wherein the port holes extend downward from the bottom side of the cable seal; and a follower comprising a cylindrical metal body and cylindrical holes, wherein the follower seats against the bottom side of the cable seal so that port holes of the cable seal protrude through the cylindrical holes of the follower.

20 Claims, 3 Drawing Sheets

FIG. 3A

PENETRATOR SYSTEM FOR ELECTRICAL SUBMERSIBLE PUMPS

CROSS-REFERENCE SECTION

This application claims priority to U.S. Provisional Application No. 63/434,301, filed on Dec. 21, 2022, which is incorporated by reference herein in its entirety for all purposes.

FIELD OF THE DISCLOSURE

The present disclosure relates, according to some embodiments, to wellhead penetrator systems for connecting downhole electric submersible pumps to electrical power sources.

BACKGROUND

Electrical submersible pumps (ESPs) are used in the oil and gas industry to artificially lift fluids out of a wellbore. ESPs include downhole pumps and motors that connect to control systems at the wellhead via electrical cables. ESP systems often utilize penetrator systems to protect the cables (e.g., ESP cables, industrial cables, electrical power cables) at the wellhead so that power is continuously provided to the ESP motor. Because drilling operations continually occur at great depths, penetrator systems must be able to withstand increased amounts of pressure generated in the wellbore.

Penetrator systems typically receive cables at a seal within the penetrator system, and at that point, the cables are cut (or spliced), and other electrical connections are made such that signals are provided to the control system at the wellhead. Penetrator systems that do provide for cables to pass through the penetrator system currently require inconvenient epoxy to be packed at the seal around the cable, and further are unable to withstand increased pressure.

Improved penetrator systems allowing for passage of the cables above the wellhead are desired.

SUMMARY

An electrical penetrator system according to the present disclosure includes a body having a cable seal disposed therein. A plurality of electrical cables is disposed through the cable seal. A polymer insulator is coupled to the body above the cable seal, and the electrical cables extend in a direction uphole of the polymer insulator. The penetrator system further includes a plurality of compression seals disposed about the electrical cables at an upper end of the polymer insulator. A compression plate is coupled to the upper end of the polymer insulator and against the compression seals to thereby compress the compression seals about the electrical cables. A cavity is defined about the electrical cables below the cable seal. Notably, the cavity is devoid of any encapsulant, filling material, such as epoxy resin or putty.

The present disclosure relates, according to some embodiments, to a wellhead penetrator system including a penetrator body including a cylindrical frame connecting a top end to a bottom end, the cylindrical frame having a hollowed interior configured to house other components of the wellhead penetrator system and an electrical submersible pumping (ESP) cable may include three electrical wires. The penetrator body may include the bottom end including a cavity configured to receive a cable that may be connected to an electrical submersible pump; and the top end configured to permit passage of the cable therethrough. The wellhead penetrator system may include a polymer insulator including a bottom face located within the penetrator body; a top face connected to the bottom face through an elongated central portion, the top face extending out of the top end of the penetrator body; and three cylinder-shaped cavities configured to each provide a path for one of the plurality of insulated electrical wires of the cable. The wellhead penetrator may include a compression plate seated on the top face of the polymer insulator and configured to fasten the wellhead penetrator system to a portion of the cable. The penetrator may include a cable seal including a cylindrical core made of a polymer having three cylinder-shaped port holes configured to each provide a path for of the three insulated electrical wires; a top side seated against the bottom face of the polymer insulator, wherein the port holes extend upward from the top side of the cable seal into the bottom face of the polymer insulator; and a bottom side facing into the cavity located in the bottom end of the penetrator body, wherein the port holes extend downward from the bottom side of the cable seal.

According to some embodiments, the present disclosure relates to a wellhead penetrator system that may include a penetrator body including a cylindrical frame connecting a top end to a bottom end, the cylindrical frame having a hollowed interior configured to house other components of the penetrator system and an electrical submersible pumping (ESP) cable may include three electrical wires. The penetrator body may include the bottom end having a cavity configured to receive a cable that may be connected to an electrical submersible pump. The penetrator body may include the top end configured to permit the cable to pass therethrough. The wellhead penetrator system may include a cable seal located within the penetrator body, the cable seal including a cylindrical core made of a polymer having three cylinder-shaped port holes configured to each provide a path for the three insulated electrical wires; a top side, wherein the port holes extend upward from the top side of the cable seal; and a bottom side facing into the cavity located in the bottom end of the penetrator body, wherein the port holes extend downward from the bottom side of the cable seal. The wellhead penetrator system may include a follower may include a cylindrical metal body and three cylindrical holes, wherein the follower seats against the bottom side of the cable seal so that port holes of the cable seal protrude through the cylindrical holes of the follower.

The wellhead penetrator may include a plurality of compression seals fitting into the cylinder-shaped cavities located at the top face of the polymer insulator where the polymer insulator meets the compression plate, wherein the compression plate may be configured to compress the plurality of compression seals about the cables at each site they pass through the polymer insulator, thereby forming a seal at each site.

The wellhead penetrator may include a contoured cable positioner that may include a coupling portion may include an annular shape and an outside diameter that may be less than an inside diameter of the penetrator body, the coupling portion configured to seat inside the bottom end of the penetrator body. The coupling portion may include an annular shape and an outside diameter that matches the outside diameter of the penetrator body where the components meet, wherein the outside diameter of the contoured portion narrows as it extends away from the penetrator body. In some embodiments, the inside diameters of each of the coupling portion and the contoured portion are large enough to receive the cable while wrapped in an armored sleeve.

The compression seals may be made from a polymer may include a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone, and mixtures thereof. The polymer insulator may be made from a polymer may include a polyether ether ketone, a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone, and mixtures thereof. The compression plate may be made from a steel alloy, a polymer, or a mixture thereof. The compression plate may be from about 0.5 inches thick to about 4 inches thick. The cavity may be devoid any filling material.

The wellhead penetrator system may include a follower may include a cylindrical metal body and three cylindrical holes, wherein the follower seats against the bottom side of the cable seal so that port holes of the cable seal protrude through the cylindrical holes of the follower. The cable seal may be one-piece and multi-point pressure activated. The port holes may extend downward from the bottom side of the cable seal are configured to seat against electrical wires of the cable having the lead jacket intact.

BRIEF DESCRIPTION OF THE DRAWINGS

Some embodiments of the disclosure may be understood by referring, in part, to the present disclosure and the accompanying drawings, wherein.

DETAILED DESCRIPTION

The present disclosure relates to wellhead penetrator systems for creating a seal around cables, to prevent fluid and gas escape to the surface, as the cables pass through a wellhead. Cables may include, but are not limited to, electrical submersible pumping (ESP) cables, industrial cables, electrical power cables. Wellheads are a common intermediate point when connecting various components of an electric submersible pump system. For example, the wellhead penetrator systems disclosed herein may connect a down well electrical submersible pump to a line box and/or a control center through cables in a manner enables safe passage of the cable through the wellhead while providing a seal from wellbore pressures and atmosphere while not interrupting power delivery as it is connected to the line box and/or control center.

Figure 1:
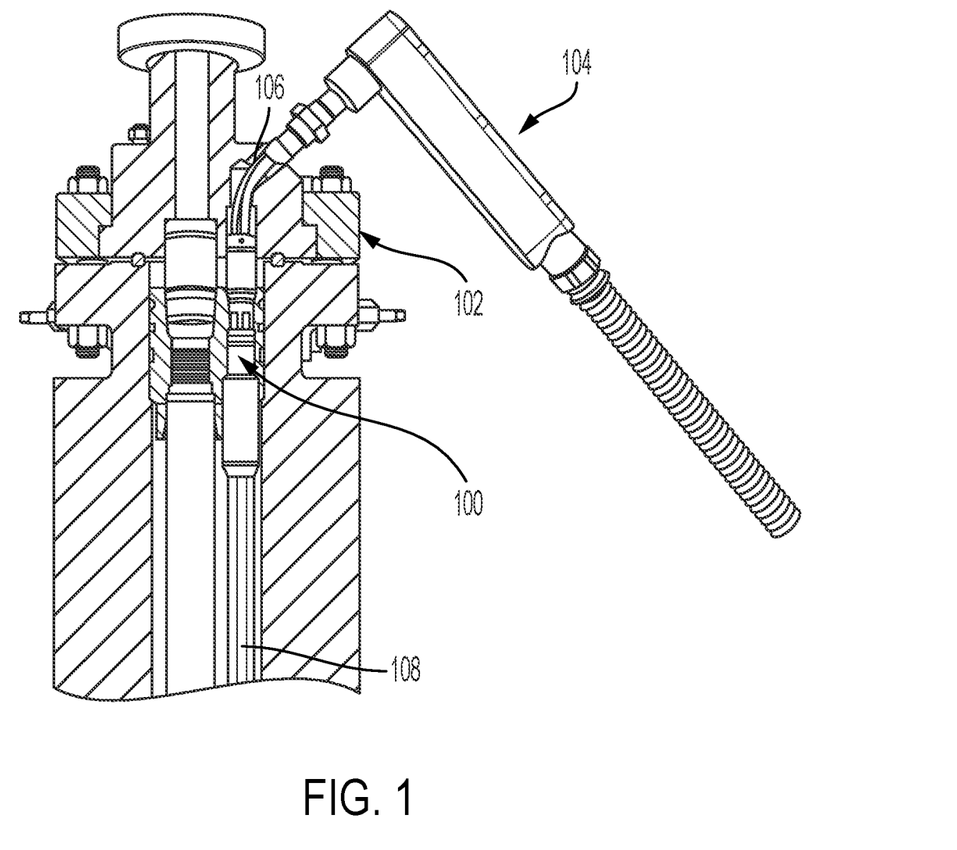
FIG. 1 illustrates a disclosed wellbore penetrator system connecting to a line box and a wellhead, according to an example embodiment of the disclosure.

As shown in FIG. 1, a disclosed wellhead penetrator system 100 may receive cables 106 from down well and connect them to a line box 104 upwell of the wellhead 102. Cables 106 are generally multi-layered. At the core layer of the cables 106 are three metal conductor wires that each have a polymer insulation layer surrounding them. The polymer insulation layers are individually covered by lead jackets, which may or may not be individually covered by a polymer braid. The braid covered wires are grouped together by an armor layer that protects the cables 106. As shown in FIG. 1, the wellhead penetrator system 100 may receive the cables 106 that are fully covered by an armor layer 108. The armor layer 108 may be removed as the cables 106 transition through the wellhead penetrator system 100 so that only a sub-layer (e.g., insulation layer) remains as the cables 106 exit the top of the wellhead penetrator system 100. Disclosed wellhead penetrator systems 100, as shown in FIG. 1, do not require the cables 106 be spliced, which is a significant advantage over known penetrator systems. cables 106 may run directly through and then above disclosed wellhead penetrator systems 100 so they can be connected to a line box 104.

Figure 2:
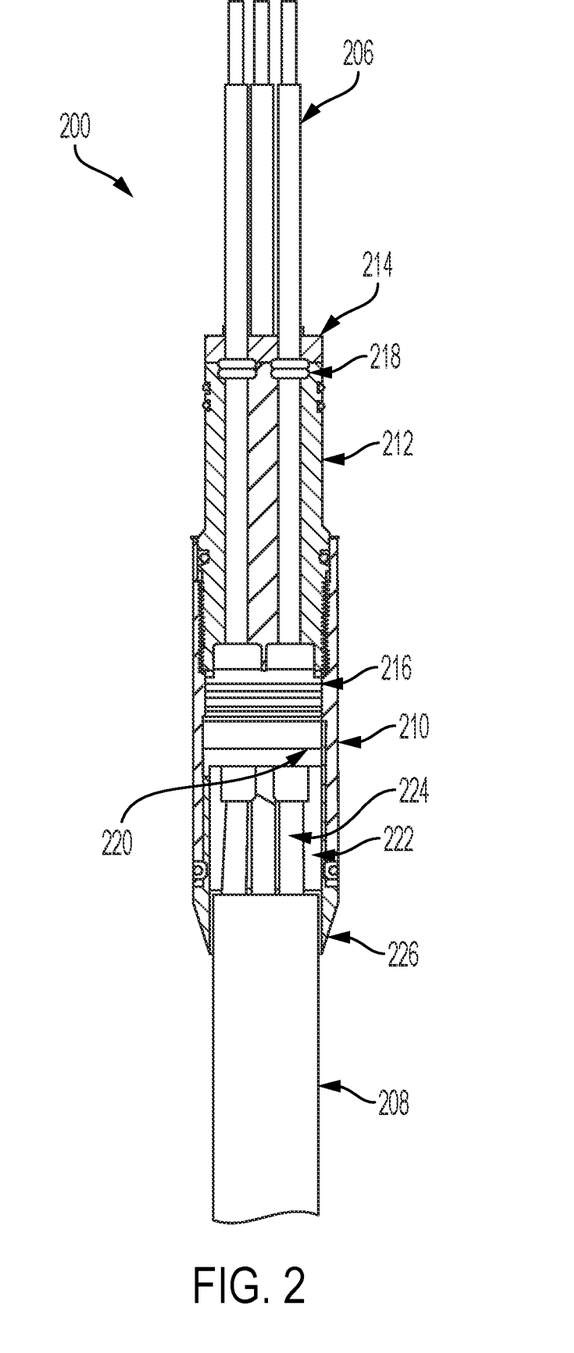
FIG. 2 illustrates a cross-sectional view of disclosed wellbore penetrator, according to an example embodiment of the disclosure.

Known penetrator systems generally cut or splice cables at the seal portion of their penetrator systems. Disclosed wellhead penetrator systems 100 that do not require cutting or splicing of the cables provide enhanced sealing, stability, and pressure resistance in comparison to known systems, making them safer and more reliable. Component numbers increase incrementally based on which figure they are depicting. For example, component 100 in FIG. 1 will be annotated as component 200 in FIG. 2 and as component 300 in FIG. 3. As shown in FIG. 2, the cables 206 pass through the disclosed wellhead penetrator system 200 without being spliced. FIG. 2 illustrates a cross-sectional view of disclosed wellbore penetrator 200.

In some embodiments, as shown in FIG. 2, the disclosed wellhead penetrator system 200 may include a penetrator body 210, a polymer insulator 212, a compression plate 214, a cable seal 216, and a follower 220, in various permutations. For example, the wellhead penetrator system 200 may include the penetrator body 210, the polymer insulator 212, the compression plate 214, and the cable seal 216. In some embodiments, the wellhead penetrator system 200 may include the penetrator body 210, the cable seal 216, and the follower 220.

As shown in FIG. 2, the disclosed wellhead penetrator system 200 may include the penetrator body 210 having a cylindrical frame connecting a top end to a bottom end. The cylindrical frame may have a hollowed interior configured to house other components of the wellhead penetrator system 200 along the cable 206, if present. The bottom end of the penetrator body 210 may include a cavity configured to receive the cable 206 that is wrapped in the armored sleeve 208. The cable 206, as shown in FIG. 2, may extend down from the bottom end of the penetrator body 210 (cable shown as 224 here) into a lower cavity 222 to connect to the electrical submersible pump. The cable 206 may pass through and out of the top end of the penetrator body 210 to connect to the line box (see FIG. 1), or other electronic devices.

In some embodiments, the penetrator body 210 may be made from a metal, a polymer, or a mixture thereof. The penetrator body 210 may be made from a metal including any steel alloys, such as zinc 4130. The penetrator body 210 may be made from a polymer including a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone, and mixtures thereof. The penetrator body 210 may have an outside diameter ranging from about 1 inch to about 10 inches. For example, the penetrator body 210 may have an outside diameter of about 1 inch, or of about 2 inches, or of about 3 inches, or of about 4 inches, or of about 5 inches, or of about 6 inches, or of about 7 inches, or of about 8 inches, or of about 9 inches, or of about 10 inches, where about includes plus or minus 0.5 inches.

The penetrator body 210 may form a cavity having an inside diameter ranging from about 0.5 inches to about 10 inches. For example, the penetrator body may have an inside diameter of about 0.5 inches, or about 1 inch, or of about 2 inches, or of about 3 inches, or of about 4 inches, or of about 5 inches, or of about 6 inches, or of about 7 inches, or of about 8 inches, or of about 9 inches, or of about 10 inches, where about includes plus or minus 0.5 inches. The cavity of the penetrator body 210 may be devoid of any filling material when combined with the remaining components of the wellhead penetrator system 200. Notably, the cavity may be devoid of filling material such as an epoxy resin or putty to be provided in the cavity defined around the cables where the cables enter the cable seal 216 from the downhole direction. The penetrator body 210 may have a length ranging from about 1 inch to about 50 inches, or more. For example, the penetrator body 210 may have a length of about 1 inch, or about 5 inches, or about 10 inches, or about 15 inches, or about 20 inches, or about 25 inches, or about 30 inches, or about 35 inches, or about 40 inches, or about 45 inches, or about 50 inches, where about includes plus or minus 2.5 inches.

As shown in FIG. 2, the disclosed wellhead penetrator system 200, may include the polymer insulator 212. The polymer insulator 212 may include a bottom face that is configured to seat inside the penetrator body 210 and even seat against the cable seal 216. The polymer insulator 212 may include a top face connected to the bottom face through an elongated central portion. As shown in FIG. 2, the top face may extend out of the top end of the penetrator body 210. The polymer insulator 212 may include a plurality of cylinder-shaped cavities configured to each provide a path for one of the plurality of insulated wires of the cable 206. The polymer insulator 212 may insulate the wellhead penetrator system 200 and cable 206 from electricity, heat, pressure and movement-based damage. The polymer insulator may also serve to provide a mechanical and pressure barrier interface with the wellhead for the purpose of retaining the penetrator system within the wellhead/wellhead hanger or other pressure control apparatus. This polymer insulator may be made from a metal including any steel alloys, such as zinc 4130 and may be coated or non-coated with insulating materials made from a polymer including a polyether ether ketone, a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone, and mixtures thereof.

The polymer insulator 212 may be made from a polymer including a polyether ether ketone, a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone, and mixtures thereof. For example, the polymer insulator 212 may be a polyether ether ketone (PEEK) polymer. The polymer insulator 212 may have an outside diameter ranging from about 1 inch to about 10 inches. For example, the polymer insulator 212 may have an outside diameter of about 1 inch, or of about 2 inches, or of about 3 inches, or of about 4 inches, or of about 5 inches, or of about 6 inches, or of about 7 inches, or of about 8 inches, or of about 9 inches, or of about 10 inches, where about includes plus or minus 0.5 inches. The inside diameters of each of the cylinder-shaped cavities may include any diameter big enough to hold cables 206, including ESP cables, industrial cables, or other electrical power cables.

As shown in FIG. 2, the disclosed wellhead penetrator system 200 may include a compression plate 214 seated on the top face of the polymer insulator 212. The compression plate 214 may be configured to fasten the wellhead penetrator system 200 to a portion of the cable 206 so that movement caused from oil production activities does not loosen any of the seals or displace any component configurations. The compression plate 214 may stick to the polymer insulator 212 through the action of compression, an adhesive, or even threadably screwing onto other components of the wellhead penetrator system 200. The compression plate 214 may have an outside diameter ranging from about 1 inch to about 10 inches. For example, the compression plate 214 may have an outside diameter of about 1 inch, or of about 2 inches, or of about 3 inches, or of about 4 inches, or of about 5 inches, or of about 6 inches, or of about 7 inches, or of about 8 inches, or of about 9 inches, or of about 10 inches, where about includes plus or minus 0.5 inches. The compression plate 214 may have a thickness ranging from about 0.5 inches to about 4 inches. For example, the compression plate 214 may have a thickness of about 0.5 inches, or about 1 inch, or about 2 inches, or about 3 inches, or about 4 inches, where about includes plus or minus 0.5 inches. The compression plate 214 may be made of any metal (e.g., steel), polymer, or a mixture thereof (e.g., polymer coated metal).

FIG. 2 discloses the wellhead penetrator system 200 including the cable seal 216. The cable seal 216 may be a multi-point pressure activated one-piece cable seal 216. Disclosed cable seal 216 may have pressure-activated sealing capabilities at pressures up to and beyond 5,000 psi. For example, the cable seal 216 may provide for a pressure activated sealing at a pressure of about 1,000 psi, or about 2,000 psi, or about 3,000 psi, or about 4,000 psi, or about 5,000 psi, or about 6,000 psi, or about 7,000 psi, or about 8,000 psi, or about 9,000 psi, or about 10,000 psi, 11,000 psi, 12,000 psi, 13,000 psi, 14,000 psi, 15,000 psi, 16,000 psi, 17,000 psi, 18,000 psi, 19,000 psi, 20,000 psi where about includes plus or minus 500 psi. The cable seal 216 may include a cylindrical core made of a polymer having multiple (e.g., three) cylinder-shaped port holes configured to each provide a path for the insulated electrical wires of the cable 206. The cable seal 216 may include a top side that may be seated against the bottom face of the polymer insulator 212, wherein the port holes extend upward from the top side of the cable seal 216 into the bottom face of the polymer insulator 212. The cable seal 216 may include a bottom side facing into the cavity located in the bottom end of the penetrator body 210 so that the port holes extend downward from the bottom side of the cable seal 216. In some embodiments, the port holes extend downward from the bottom side of the cable seal 216 and receive the cables 206 that have had the armored sleeve 208 removed. Where the cables 206 meet the port holes, the cables 206 may have the armored sleeve 208 and braid removed so the lead jacket remains intact.

As shown in FIG. 2, the cable seal 216 may be held in place via a contoured cable positioner 226. The cable seal 216 may be designed to withstand downhole well pressure. The cable seal 216 may include a first set of projections that extends towards a polymer insulator 212 and a second set of projections that extend in an opposite direction, towards the cavity of the penetrator body 210. The projections may define cylindrical openings for receiving the cables 206 therethrough. In some embodiments, the cable seal 216 may be formed of a polymer (e.g., rubber) to facilitate a seal (e.g., mechanical seal) with the body.

The cable seal 216 may include an outside diameter ranging from about 1 inch to about 10 inches. For example, the cable seal 216 may have an outside diameter of about 1 inch, or of about 2 inches, or of about 3 inches, or of about 4 inches, or of about 5 inches, or of about 6 inches, or of about 7 inches, or of about 8 inches, or of about 9 inches, or of about 10 inches, where about includes plus or minus 0.5 inches. The inside diameters of each of the port holes may include any diameter big enough to hold any known cables 206. The cable seal 216 may be made from a polymer including a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone, and mixtures thereof.

As shown in FIG. 2, in some embodiments, the disclosed wellhead penetrator system 200 may include the compression seal 218 that fits into a cylinder-shaped cavity located at the top face of the polymer insulator 212 where the polymer insulator 212 meets the compression plate 214. The compression plate 214 may be configured to compress the compression seals 218 about the cables 206 at each site they pass through the polymer insulator 212, thereby forming a seal at each site. The wellhead penetrator system 200 may include the plurality of compression seals 218, such as ranging from 1-5 compression seals 218. The compression seal 218 may be made from a polymer including a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone, and mixtures thereof. The compression seals 218 may be generally cylindrical in shape and may have an inside diameter large enough for the cables 206 to fit through and may have an outside diameter large enough to seal a portion of each cylinder-shaped cavity of the polymer insulator 212.

In some embodiments, the cable seal 216 may abut against the polymer insulator 212. In some embodiments, the polymer insulator 212 may be formed of PEEK material that insulates the cables 206 passing through the polymer insulator 212. Each cable 206 may also have rubber or polymer insulator wrapped around the cables. Each of the cables 206 may have a corresponding compression seal 218 disposed about the cable 206 at an upper portion of the polymer insulator 212. The compression plate 214 may be utilized to bear down on the compression seals 218 to form a seal about the cables 206 where the cables 206 exit the polymer insulator 212. In some embodiments, the compression plate 214 may be threaded to the polymer insulator 212 via set screws, thus applying the desired compression force to form the compression seals 218.

In some embodiments, as shown in FIG. 2, the wellhead penetrator system 200 may include the follower 220 including a cylindrical metal body and from 1-3 cylindrical holes. The follower 220 may be configured to seat against the bottom side of the cable seal 216 so that the port holes of the cable seal protrude through the cylindrical holes of the follower 220. The follower 220 may have an outside diameter of about 1 inch, or of about 2 inches, or of about 3 inches, or of about 4 inches, or of about 5 inches, or of about 6 inches, or of about 7 inches, or of about 8 inches, or of about 9 inches, or of about 10 inches, where about includes plus or minus 0.5 inches. The outside diameter of the follower 220 may contract part way through the length of the follower 220. For example, the follower 220 may have an outside diameter of about 4 inches towards its top and have an outside diameter of about 3 inches towards its bottom. The difference in outside diameter between the top portion and bottom portion of the follower 220 may from about 0.1 inches to about 2 inches. For example, the difference in outside diameter between the top portion and bottom portion of the follower 220 may be about 0.1 inches, or about 0.25 inches, or about 0.5 inches, or about 0.75 inches, or about 1 inch, or about 1.25 inches, or about 1.5 inches, or about 1.75 inches, or about 2 inches, where about includes 0.125 inches. The inside diameters of each of the port holes may include any diameter big enough to hold any cables 206, including ESP cables, industrial cables, or other electrical power cables. The follower 220 may be made of any known metal, including steel alloys.

As shown in FIG. 2, the wellhead penetrator system 200 may include the contoured cable positioner 226 configured to couple to the bottom end of the penetrator body 210. The contoured cable positioner 226 may include a coupling portion and a contoured portion. The coupling portion may have an annular shape and an outside diameter that is less than the inside diameter of the penetrator body 210. The coupling portion may be configured to seat inside the bottom end of the penetrator body 210. The contoured cable positioner 226 may be coupled to the penetrator body 210 via a fastener, such as a screw or the like. The contoured portion may have an annular shape and an outside diameter that matches the outside diameter of the penetrator body 210 so that the surfaces are substantially smooth when coupled where the components meet. The outside diameter of the contoured portion may narrow as it extends away from the penetrator body 210. In some embodiments, the inside diameters of each of the coupling portion and the contoured portion are large enough to receive the cable 206 while wrapped in an armored sleeve 208.

According to some embodiments, the portion of the cables 206 that exit the armored sleeve 208 and enter the cable seal 216 may be housed in a lead jacket to protect against decompression and any adverse well or well fluid conditions. The cavity may be defined in the region of the penetrator body 210 where the cables 206 exit the armored sleeve 208 and enter the cable seal 216. In prior art arrangements, a filler material, such as an epoxy resin, is required to be disposed within a similar cavity in order to protect against downhole well pressure. However, according to the principles of the present disclosure, no such filler material is required to be disposed in the cavity as the integrity of the cable seal 216 and the upper compression seals 218 are sufficient to guard against undesirable downhole well pressure. Disclosed configurations advantageously reduce material needed for manufacture of the penetrator system as well as improves ease of use. This configuration also allows the cable seal 216 to expand and contract dynamically thus creating a pressure balanced sealing mechanism. The allowance of movement due to lack of filler material prevents the cable seal 216 from mechanical damage during expansion and contraction thus improving longevity of the sealing system.

Figure 3A:
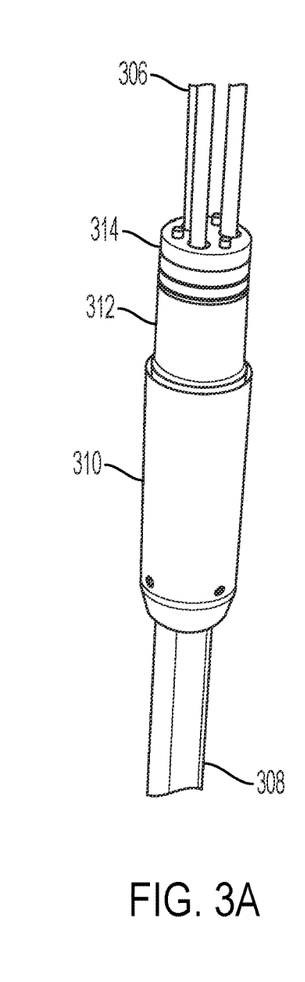
FIG. 3A illustrates a top isometric view of a disclosed wellbore penetrator, according to an example embodiment of the disclosure.
Figure 3B:
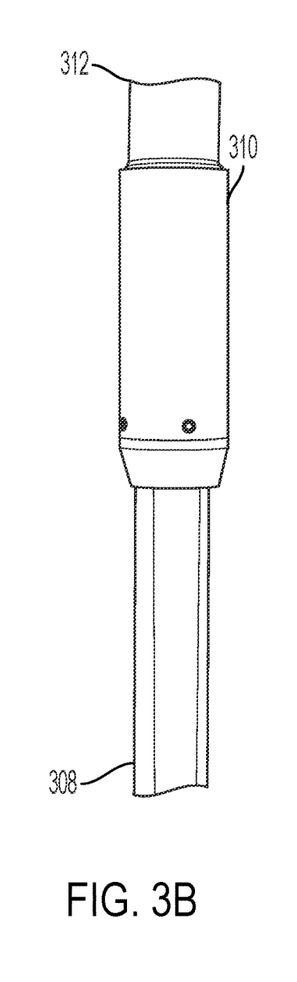
FIG. 3B illustrates a side view of the disclosed wellbore penetrator of FIG. 3A; according to an example embodiment of the disclosure.

FIGS. 3A-3E illustrate the disclosed wellhead penetrator system 300 having the above-described components and engaged with a cable 306 having an armored sleeve 308. The penetrator system 300 may include the cable seal 316 (i.e., boot seal) for receiving cables 306 from downhole and passing the cables 306 through the polymer insulator 312 (such as one made of polyether ether ketone or "PEEK" material) and uphole to the wellhead. The cable seal 316 may be housed within the penetrator body 310, such as a steel housing, that also retains the PEEK insulator and armored sleeve 308 that encapsulates the cables 306 in a downhole direction. The wellhead penetrator system 300 may further includes the contoured cable positioner 326 where the cables 306 exit the armored sleeve 308 and enter the wellhead penetrator system 300. The wellhead penetrator system 300 may also include compression seals (see 218 from FIG. 2) provided at the uphole end of the PEEK polymer insulator 312. The compression plate 314 may be provided to compress the compression seals around the cables 308 to further protect against downhole pressure. The wellhead penetrator system 300 described herein may not need an encapsulant filling material such as epoxy resin or putty to be provided in the cavity defined by the penetrator body 310 and around the cables 306 where the cables 306 enter the cable seal 316 from the downhole direction. Further, the wellhead penetrator system 300 may be rated for high pressure, as much as 5,000 psi and more. For example, the wellhead penetrator system 300 may be rated for a pressure of about 1,000 psi, or about 2,000 psi, or about 3,000 psi, or about 4,000 psi, or about 5,000 psi, or about 6,000 psi, or about 7,000 psi, or about 8,000 psi, or about 9,000 psi, or about 10,000 psi, or about 11,000 psi, or about 12,000 psi, or about 13,000 psi, or about 14,000 psi, or about 15,000 psi, or about 16,000 psi, or about 17,000 psi, or about 18,000 psi, or about 19,000 psi, or about 20,000 psi, where about includes plus or minus 500 psi. The wellhead penetrator system 300 may further protect against harmful elements, such as fluid intrusion, gas intrusion, debris, or the like. As shown in FIGS. 3A and 3B, disclosed wellhead penetrator system 300 may be assembled so that the polymer insulator 312 protrudes outward above the penetrator body 310. Above the polymer insulator 312 may be compression plate 314, and the cable 306 may extend outward from the compression plate 314 so that it may connect to above well components, such as the line box.

Figure 3C:
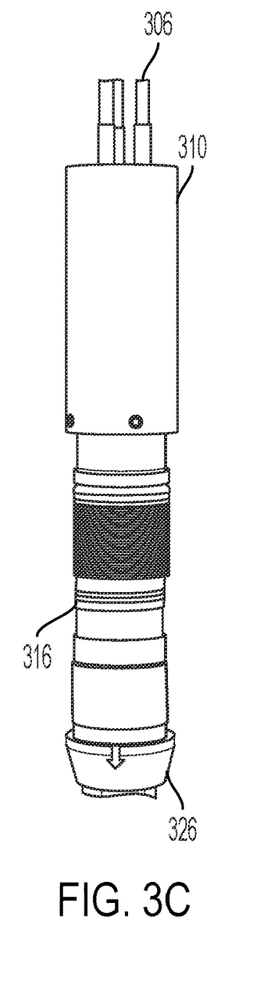
FIG. 3C illustrates a side view of the disclosed wellbore penetrator of FIG. 3A with body slid up to show the interior components, according to an example embodiment of the disclosure.

FIG. 3C illustrates the wellhead penetrator system 300 of FIG. 3A, but with the penetrator body 310 slid up so that the components of this embodiment are viewable. As shown in FIG. 3C, the wellhead penetrator system 300 may include the contoured cable positioner 326 receiving the cable 306 wrapped in armor 308. Follower 320 may seat above the contoured cable positioner 326 with the cable seal 316 seating above the follower 320.

Figure 3D:
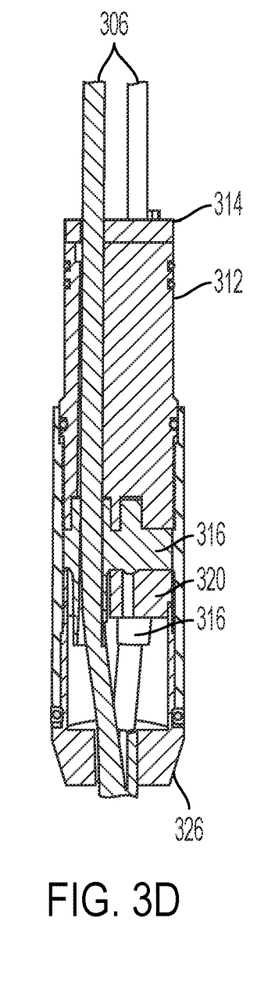
FIG. 3D illustrates a cross-sectional view of the wellbore penetrator of FIG. 3A, according to an example embodiment of the disclosure.
Figure 3E:
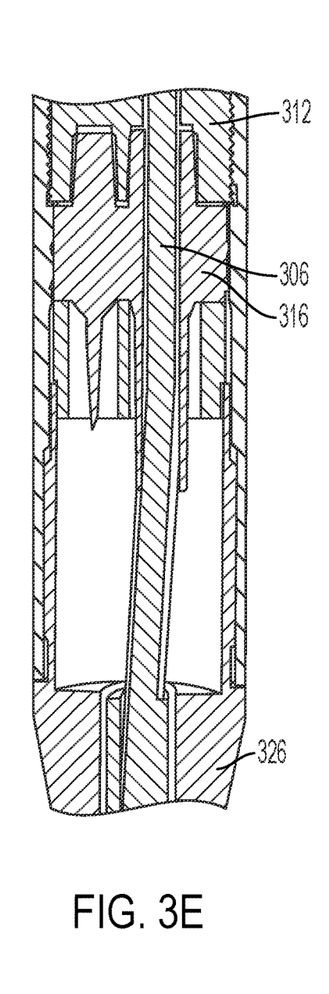
FIG. 3E illustrates a zoomed in cross-sectional view of the wellbore penetrator of FIG. 3A, according to an example embodiment of the disclosure.

FIGS. 3D and 3E are cross-sectional views of the wellhead penetrator system 300 of FIG. 3A. Each of these figures show the connectivity of an embodiment where the compression plate 314 sits above the polymer insulator 312, which is above the cable seal 316 and the follower 320. As shown in FIG. 3D, the port holes of the cable seal 316 may protrude through the cylindrical holes of the follower 320 while extending into the cavity formed by the penetrator body 310. Below the penetrator body is the contoured cable positioner 326. FIGS. 3D and 3E show how an un-spliced cable 306 may travel through the entire wellhead penetrator system 300.

The above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

The invention claimed is:

1. A wellhead penetrator system comprising:
   (a) a penetrator body comprising:
      (i) a cylindrical frame connecting a top end to a bottom end, the cylindrical frame having a hollowed interior configured to house other components of the wellhead penetrator system and a cable comprising three electrical wires;
      (ii) the bottom end comprising a cavity configured to receive the cable that is connected to an electrical submersible pump; and
      (iii) the top end configured to permit passage of the cable therethrough;
   (b) a polymer insulator comprising:
      (i) a bottom face located within the penetrator body;
      (ii) a top face connected to the bottom face through an elongated central portion, the top face extending out of the top end of the penetrator body; and
      (iii) three cylinder-shaped cavities configured to each provide a path for one of the plurality of insulated electrical wires of the cable;
   (c) a compression plate seated on the top face of the polymer insulator and configured to fasten the wellhead penetrator system to a portion of the cable; and
   (d) a cable seal, comprising:
      (i) a polymer having three cylinder-shaped port holes configured to each provide a path for of the three insulated electrical wires;
      (ii) a top side seated against the bottom face of the polymer insulator, wherein the port holes extend upward from the top side of the cable seal into the bottom face of the polymer insulator; and
      (iii) a bottom side facing into the cavity located in the bottom end of the penetrator body, wherein the port holes extend downward from the bottom side of the cable seal.

2. The wellhead penetrator system according to claim 1, further comprising:
   a plurality of compression seals fitting into the cylinder-shaped cavities located at the top face of the polymer insulator where the polymer insulator meets the compression plate,
   wherein the compression plate is configured to compress the plurality of compression seals about the cables at each site they pass through the polymer insulator, thereby forming a seal at each site.

3. The wellhead penetrator system according to claim 2, wherein the compression seals are made from a polymer comprising one or more of a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, and a silicone.

4. The wellhead penetrator system according to claim 1, further comprising:
   a contoured cable positioner comprising: a coupling portion comprising an annular shape and an outside diameter that is less than an inside diameter of the penetrator body, the coupling portion configured to seat inside the bottom end of the penetrator body; and a contoured portion comprising an annular shape and an outside diameter that matches the outside diameter of the penetrator body where the components meet, wherein the outside diameter of the contoured portion narrows as it extends away from the penetrator body; wherein the inside diameters of each of the coupling portion and the contoured portion are large enough to receive the cable while wrapped in an armored sleeve.

5. The wellhead penetrator system according to claim 1, wherein the polymer insulator is made from one or more of a polymer comprising a polyether ether ketone, a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone.

6. The wellhead penetrator system according to claim 1, wherein the compression plate is made from a steel alloy, a polymer, or a mixture thereof.

7. The wellhead penetrator system according to claim 1, wherein the compression plate is from about 0.5 inches thick to about 4 inches thick.

8. The wellhead penetrator system according to claim 1, wherein the cavity is devoid any filling material.

9. The wellhead penetrator system according to claim 1, further comprising: a follower comprising a cylindrical metal body and three cylindrical holes,
   wherein the follower seats against the bottom side of the cable seal so that port holes of the cable seal protrude through the cylindrical holes of the follower.

10. The wellhead penetrator system according to claim 1, wherein the cable seal is one-piece and multi-point pressure activated.

11. The wellhead penetrator system according to claim 1, wherein the port holes extending downward from the bottom side of the cable seal are configured to seat against the electrical wires of the cable having a lead jacket intact.

12. A wellhead penetrator system comprising:
   (a) a penetrator body comprising:
      (i) a cylindrical frame connecting a top end to a bottom end, the cylindrical frame having a hollowed interior configured to house other components of the penetrator system and a cable comprising three electrical wires;
      (ii) the bottom end comprising a cavity configured to receive the cable that is connected to an electrical submersible pump; and
      (iii) the top end configured to permit the cable to pass therethrough;
   (b) a cable seal located within the penetrator body, comprising:
      (i) a polymer having three cylinder-shaped port holes configured to each provide a path for the three insulated electrical wires;
      (ii) a top side, wherein the port holes extend upward from the top side of the cable seal; and
      (iii) a bottom side facing into the cavity located in the bottom end of the penetrator body, wherein the port holes extend downward from the bottom side of the cable seal; and
   (c) a follower comprising a cylindrical metal body and three cylindrical holes, wherein the follower seats against the bottom side of the cable seal so that port holes of the cable seal protrude through the cylindrical holes of the follower.

13. The wellhead penetrator system according to claim 12, further comprising: a polymer insulator comprising:
   (i) a bottom face located within the penetrator body and fitting up against the top side of the cable seal;

(ii) a top face connected to the bottom face through an elongated central portion, the top face extending out of the top end of the penetrator body; and (iii) three cylinder-shaped cavities configured to each provide a path for one of the plurality of insulated electrical wires of the cable.

14. The wellhead penetrator system according to claim 13, further comprising:

a compression plate seated on the top face of the polymer insulator and configured to fasten the wellhead penetrator system to a portion of the cable.

15. The wellhead penetrator system according to claim 14, comprising at least one of: the compression plate is made from a steel alloy, a polymer, or a mixture thereof, and the compression plate is from about 0.5 inches thick to about 4 inches thick.

16. The wellhead penetrator system according to claim 14, further comprising: a plurality of compression seals fitting into the cylinder-shaped cavities located at the top face of the polymer insulator where the polymer insulator meets the compression plate, wherein the compression plate is configured to compress the plurality of compression seals about the cables at each site they pass through the polymer insulator, thereby forming a seal at each site.

17. The wellhead penetrator system according to claim 16, wherein the compression seals are made from a polymer comprising one or more of polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone.

18. The wellhead penetrator system according to claim 13, wherein the polymer insulator is made from one or more of a polymer comprising a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone.

19. The wellhead penetrator system according to claim 12, wherein the cable seal is made from one or more of a polymer comprising a polyether ether ketone, a polyethylene, a polypropylene, a polystyrene, a polyvinyl chloride, a synthetic rubber, a phenol formaldehyde resin, a neoprene, a nylon, a polyacrylonitrile, a polyvinyl butyral, a silicone.

20. The wellhead penetrator system according to claim 12, wherein the penetrator body is made from a metal, a polymer, or a mixture thereof.

* * * * *